UNITED STATES PATENT OFFICE.

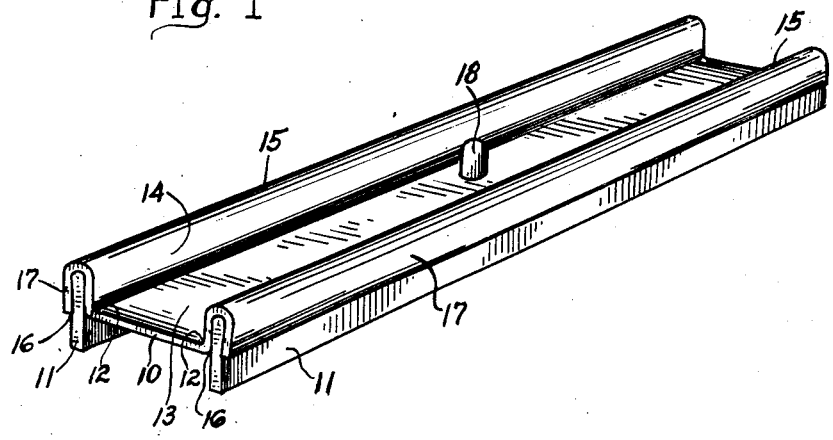
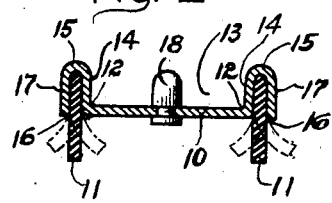
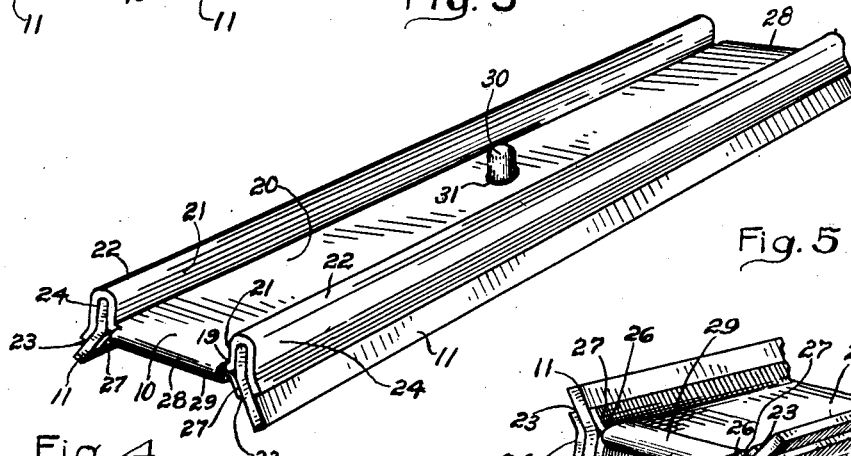
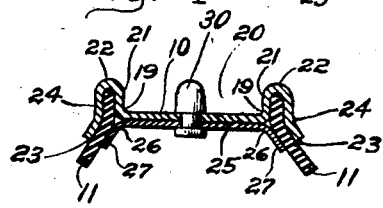
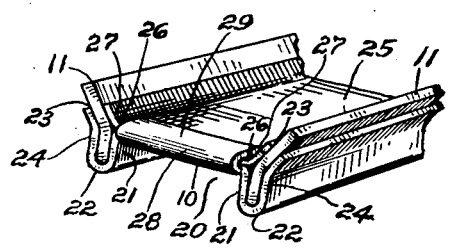

JULIUS PEDERSON, OF BRIDGEPORT, CONNECTICUT.

WINDSHIELD-CLEANER.

1,370,910.  Specification of Letters Patent.  Patented Mar. 8, 1921.

Application filed August 30, 1920. Serial No. 406,950.

*To all whom it may concern:*

Be it known that I, JULIUS PEDERSON, a citizen of the United States, and resident of Bridgeport, in the county of Fairfield and State of Connecticut, have invented certain new and useful Improvements in Windshield-Cleaners, of which the following is a specification.

This invention has for its object to provide a wiper member for window cleaners which shall be extremely simple in construction, efficient and durable in use and cheap to manufacture.

With the above and other objects in view, the invention comprises the construction and arrangement of parts as now to be fully described and hereinafter specifically claimed.

In the accompanying drawing forming a part of this specification,

Figure 1 is a perspective view of the wiper member of the invention;

Fig. 2 is a transverse sectional view of the wiper member of Fig. 1;

Fig. 3 is a perspective view of a modified form of the invention;

Fig. 4 is a transverse sectional view of the wiper member of Fig. 3; and

Fig. 5 is a fragmentary perspective end view looking toward either end of the wiper member of Fig. 3.

Referring to Figs. 1 and 2, the wiper member consists of a wiper bar 10 of resilient material and wiper strips 11 of any material suitable for their purpose. As very clearly shown, the opposite side edges of the wiper bar are bent backwardly at approximate right angles, as indicated at 12, to provide a way 13 for a purpose to be explained, and the backwardly bent portions denoted by 14, which define the side walls of the way, are curved over forwardly, as denoted at 15, to provide channels 16 for the wiper strips, the outer walls of the channels, denoted by 17, terminating preferably at about the line of the body of the wiper bar. It will of course be understood that after the wiper strips are inserted in their channels, the side walls of the channels are pressed toward each other to effectually grip the wiper strips in position.

The holder for the wiper member of the invention is intended to be inserted against the back face of the wiper bar and between the side walls of the way thereof. The holder can be rigidly secured to the wiper bar, or the wiper bar can be provided with a headed rivet 18 the head of which may enter a perforation in the holder for the wiper bar to be removably attached thereto. Rivet 18 is preferably placed at the midlength of the wiper bar so that when the holder is applied the wiper member can be evenly and smoothly drawn over a window as will be obvious.

Refering to the form of wiper member disclosed in Figs. 3, 4 and 5, it may be remarked that the wiper bar is, as before, curved backward at approximate right angles, as indicated at 19, to provide a way 20 defined by the side walls 21 which are curved forwardly as denoted at 22 to provide channels 23 for the similar wiper strips. However, the outer walls of the channels, denoted by 24, terminate a slight distance in front of the line of the body of the wiper bar and are curved outward slightly as clearly shown and for a purpose which will be made obvious. As in the case of the wiper members of Figs. 1 and 2, the wiper strips are inserted in the channels and the walls of the channels are pressed toward each other to effectually grip the wiper strips. Additional means for holding the wiper strips of the modified wiper member comprises a clamp member 25 of resilient material such as metal which is adapted to be positioned against the front face of the wiper bar as more clearly shown in Fig. 4. Near its side edges, as shown at 26, the clamp member is bent forwardly to provide clamping walls which are parallel with the outwardly curved portions of the outer walls of the channels for the wiper strips. It will be understood that clamping walls 27 are likewise pressed toward the outer walls of the channels to more effectually grip the wiper strips. The clamp member can be held to the front face of the wiper bar in any desired manner. As shown, the opposite ends of the body of the wiper bar are extended beyond the channeled portions thereof and are curved around, as indicated at 28, and clamped down, as indicated at 29, against the front face of the clamp member for this purpose. The wiper bar of the modified form can be secured to a holder in any desired manner, the holder being adapted to rest in the way of the wiper bar as before. A similar headed rivet 30 for a similar purpose may be carried by the clamp member and the body of the wiper bar.

The wiper strips shown in all of the figures of the drawing are similar. It will be noticed that I preferably use a strip the lower edge of which is perpendicular to both side walls. As suggested in Fig. 2, when the wiper member is in use, the wiper strips are caused to be flexed in the same direction, so that the corners of the lower edges bear against the window. As shown in Fig. 4, by extending the outer walls of the channels beyond the line of the body of the wiper bar and curving the same outwardly and providing clamping walls which are parallel with the outwardly curved channel walls, I provide in the modified form of the invention a way whereby the corners of the lower edges engage the window in the wiping operation.

It will be seen that I have provided a wiper member which is extremely simple in construction. It has been found to be exceptionally efficient in use.

What I claim is:

1. A wiper member for window cleaners comprising a wiper bar and wiper strips carried thereby, said wiper bar having its opposite side edges bent backwardly to provide ways to receive a holder, said backwardly bent portions being curved forwardly to provide channels to receive said wiper strips, portions of the outer walls of said channels being curved from each other, and a clamp member adapted to be positioned against the front face of the body of said wiper bar and provided with clamping walls which are parallel with the portions of said outer channel walls which are curved from each other, for the purpose specified.

2. A wiper member for window cleaners comprising a wiper bar and wiper strips carried thereby, said wiper bar having its opposite side edges bent backwardly to provide ways to receive a holder, said backwardly bent portions being curved forwardly to provide channels to receive said wiper strips, a clamp member adapted to be positioned against the front face of the body of said wiper bar and provided with clamping walls adapted to engage the inner faces of said wiper strips, and means for holding said clamp member to said wiper bar.

Signed at Bridgeport, in the county of Fairfield, and State of Connecticut, this 23rd day of August, A. D. 1920.

JULIUS PEDERSON.

Witnesses:
C. M. NEWMAN,
WM. G. ROCKWELL.